United States Patent Office 3,528,788
Patented Sept. 15, 1970

3,528,788
ETCHED METAL COATED DIAMOND GRAINS IN GRINDING WHEELS
Michael Seal, Leonardo, N.J., assignor to Engelhard Industries, Inc., Newark, N.J., a corporation of Delaware
No Drawing. Filed July 3, 1967, Ser. No. 650,580
Int. Cl. B24b 1/00
U.S. Cl. 51—295
3 Claims

ABSTRACT OF THE DISCLOSURE

The present invention deals with a grinding material for use in resin bonded diamond wheels and composed of diamond grit material coated with metal having an etched surface and embedded in a resin bond material.

BACKGROUND OF THE INVENTION

Resin bonded diamond grinding tools are useful for grinding of carbides, metal alloys, glass and other hard materials. They may be used wet or dry, i.e. with or without a coolant. It has been heretofore discovered that diamond grit material of appropriate mesh size for use as the abrasive in resin bonded diamond wheels exhibits an improved bond between the resin matrix and the embedded abrasive particles, improved grinding efficiency and longer wheel life, when the diamond particles are coated with a metal coating.

The present invention contemplates to improve the grinding efficiency of resin bonded diamond wheels comprising metal coated diamond grit embedded in a resin bond.

SUMMARY OF THE INVENTION

The invention deals with a grinding material for resin bonded diamond wheels comprising metal coated diamond grit embedded in a resin bond, and wherein the metal coating on the diamond grit is provided with a lightly etched surface, which etched surface improves the grinding efficiency of a grinding wheel having a portion provided with the grinding material of the invention as the abrasive part. The invention contemplates the use of a variety of metals as the coating material, e.g. metals such as Ni, Co, Ag, Cu, Mo, Ti, Al, Mn, Cd, Zn, Cr, V, Au, W, Fe, Zr, the Pt-group metals and alloys of the recited metals. Any number of suitable known etchants may be employed to provide the etched surface of the coating metal depending on the metal employed as the coating. For example, a nickel or silver coating is advantageously etched with a dilute nitric acid solution, copper with sulfuric acid, aluminum with hydrochloric acid or a caustic solution (NaOH), chromium with hydrofluoric acid, platinum group metals or gold with aqua regia, etc., in accordance with known etchants for the metal coating employed herein. Having provided the coated and etched diamond grit, the grit is mixed with a suitable resin powder preferably together with an appropriate filler material for the resin, such as powders of silicon carbide, copper, boron carbide, corundum, magnesium oxide, alumina, graphite, etc., or a filler of a plurailty of materials such as silicon carbide and magnesium oxide or silicon carbide and calcium oxide, etc. The mixture is then molded into the desired shape, e.g. in the shape of a rim, for the daimond wheel and subsequently cured. The bonding resin employed is preferably a phenolic resin for example of the type novolak, but other resins are also useful, such as epoxy resins, polyimides, alkyd resins, non-saturated polyester resins, silicones, polyamidimides, etc. A grinding wheel provided with a rim of the above-described material, e.g. 140–170 grit mesh coated with an etched nickel coating embedded in a resin of the type novolak having a filler of silicon carbide exhibited a grinding efficiency increased by a factor of about 1.6 over the performance of a grinding wheel of the same grinding material composition but with the metal coating being unetched.

DESCRIPTION OF THE PREFERRED EMBODIMENTS

In accordance with the invention, diamond grit material of appropriate size for diamond grinding wheels, typically a selected size within a range of about 60 mesh to about 200 mesh, e.g. 60–80 mesh or 140–170 mesh, is cleaned by conventional cleaning methods and water rinsed and thereafter subjected to a conventional electroless or electrolytic coating operation for providing a metal coating on the grit of from about 25 parts metal to 100 parts diamond by weight to about 275 parts metal to 100 parts diamond by weight depending on the coating metal employed. For example, a copper coating is provided as from at least about 25 parts copper to 100 parts diamond by weight, a nickel coating is provided as from at least about 60 parts nickel to 100 parts diamond by weight and a silver coating is provided as from at least about 60 parts silver to 100 parts diamond by weight. The upper range of the metal content is advantageously about 80–120 parts metal to 100 parts diamond. A higher permissible amount may be empirically established for each of the metals, but such additional amounts do not materially increase grinding efficiency above an established optimum amount for each metal.

Suitable conventional plating solutions and methods are disclosed in the Metals and Plastics Publication, Metal Finishing Guidebook Directory, 1966.

Having provided the coating on the diamond grit, the coating is preferably lightly etched, by the suitable etchant for the metal, to a metal etch loss, by wt., between 0.01%–10% of the coating, e.g., an etch loss of from 0.1% to 1.0% provides a preferred range of etch loss and, especially for the preferred nickel coating, an etch loss of about 0.2% is an optimum etch loss.

Example I

Diamond grit material of 140–170 mesh was cleaned by conventional acid treatment. The cleaned diamond grit was then sensitized in an aqueous stannous chloride solution of 70 gms./liter $SnCl_2$ and 40 gms./liter HCl, water rinsed, and then immersed in an aqueous palladium chloride solution of 1 gm./liter $PdCl_2$ and containing 1 ml. concentrated HCl, and water rinsed. The sensitized diamond was then coated in a nickel plating bath until the desired coating thickness of 117 parts nickel–100 parts diamond by weight was attained. Thereafter, the nickel coated diamond grit was etched in commercial 71% $HNO_3$ diluted with water to provide a 1:5 acid-water solution for 20 minutes at 28° C. This gave an etch loss of the nickel coating of 0.16% of the total metal. The coated and etched diamond grit was then mixed with a matrix material composed of 25% phenolic resin of the novolak type, 70% SiC and 5% MgO, in an amount sufficient to provide for a 100 diamond concentration or 72 carats per cubic inch of the diamond rim which was formed by conventional molding and curing techniques to embed the coated and etched diamonds in the resin bond of the rim, and which rim was subsequently conventionally cemented onto the periphery of a resin disc forming the core or hub of the wheel to provide a composite diamond grinding wheel having an O.D. of 5 inches.

At the same time two other wheels of identical dimensions, diamond grit mesh and concentration were prepared as described above, differing from the wheel (C) of the example only in that one wheel (A) contained uncoated embedded diamond grit and the other wheel (B) contained embedded diamonds coated with nickel in the same initial amount as given in the example but without any etching of the nickel coating. The three wheels were tested and compared under identical conditions in the wet grinding of tungsten carbide with the following results:

TABLE I

5″ O.D.—Diamond wheels
140-170—Diamond grit mesh
100 Diamond concentration

| Wheel | Grinding ratio | Grinding ratio index |
|---|---|---|
| A (uncoated) | 12.9 | 100 |
| B (coated unetched) | 28.1 | 218 |
| C (coated and etched) | 44.9 | 348 |

In Table I the grinding ratio means cubic inches of carbide removal per cubic inches of grinding wheel matrix consumed. A diamond concentration of 100 refers to 72 carats of diamond per cubic inch of grinding wheel matrix.

For purpose of comparison of the efficiency or grinding ratio of the wheels, the uncoated wheel A has been given the index number 100, and it will be seen that, while the coated but unetched wheel B has a grinding efficiency increased by a factor of 2.18 over the performance of the uncoated wheel A, the coated and etched wheel C has an efficiency factor of 3.48 over wheel A and an efficiency factor of 1.6 over that of coated wheel B.

Various modifications of the invention are contemplated within the scope of the appended claims.

I claim:

1. Grinding wheel consisting essentially of a resin matrix selected from the group consisting of phenol formaldehyde, epoxy, polyimide, alkyd, non-saturated polyester, silicone and polyamidimide resins having embedded therein diamond grit material coated with a metal selected from the group consisting of Ni, Co, Ag, Cu, Mo, Ti, Al, Mn, Cd, Zn, Cr, V, Au, W, Fe, Zr and the Pt-group metals, the metal coating having an etched surface, the coating comprising from 25 parts metal to 100 parts diamond by weight to 275 parts metal to 100 parts diamond by weight, the etched metal surface being characterized by a metal etch loss between 0.01% to 10.0% by weight of the coating, and the diamond grit material having a mesh size between 60 mesh and 200 mesh.

2. Grinding wheel according to claim 1, wherein the etched metal surface is characterized by a metal etch loss between 0.1% to 1.0% by weight of the coating.

3. Grinding wheel according to claim 1, wherein the metal coating is a nickel coating characterized by an etch loss of about 0.2% and the coated diamond grit material is embedded in a matrix composed of about 25% phenol-formaldehyde, 70% SiC and 5% MgO.

References Cited

UNITED STATES PATENTS

| 717,080 | 12/1902 | Coleman | 51—309 |
| 2,411,867 | 12/1946 | Brenner | 51—309 |
| 3,087,803 | 4/1963 | Bakian | 51—298 |
| 3,125,418 | 3/1964 | Wentorf | 51—309 |
| 3,276,852 | 10/1966 | Lemelson | 51—298 |
| 3,356,473 | 12/1967 | Hull et al. | 51—309 |

FOREIGN PATENTS 1,142,688  9/1957  France.

DONALD J. ARNOLD, Primary Examiner

U.S. Cl. X.R.

51—298, 309